United States Patent
Zhao

(10) Patent No.: US 10,333,129 B2
(45) Date of Patent: Jun. 25, 2019

(54) BUSS BAR ASSEMBLY FOR A BATTERY SYSTEM

(71) Applicant: TE CONNECTIVITY CORPORATION, Berwyn, PA (US)

(72) Inventor: Weiping Zhao, Superior Township, MI (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 121 days.

(21) Appl. No.: 15/415,990

(22) Filed: Jan. 26, 2017

(65) Prior Publication Data

US 2018/0212223 A1 Jul. 26, 2018

(51) Int. Cl.
*H01M 2/20* (2006.01)
*H01M 2/34* (2006.01)
*H01M 10/48* (2006.01)

(52) U.S. Cl.
CPC .......... *H01M 2/206* (2013.01); *H01M 2/348* (2013.01); *H01M 10/482* (2013.01); *H01M 2200/103* (2013.01); *H01M 2220/20* (2013.01)

(58) Field of Classification Search
CPC .... H01M 2/206; H01M 2/348; H01M 10/482; H01M 2200/103; H01M 2220/20
USPC ......................................................... 337/217
See application file for complete search history.

(56) References Cited

U.S. PATENT DOCUMENTS

| 4,280,748 A * | 7/1981 | McHenney | H01R 13/68 439/620.26 |
|---|---|---|---|
| 5,643,693 A * | 7/1997 | Hill | H01M 2/1083 429/121 |
| 5,645,448 A * | 7/1997 | Hill | H01H 85/205 439/522 |
| 5,805,047 A * | 9/1998 | De Villeroche | B60R 16/04 337/142 |
| 6,222,439 B1 * | 4/2001 | Tanigawa | H01H 39/006 180/279 |
| 6,294,978 B1 * | 9/2001 | Endo | H01H 85/044 337/159 |

(Continued)

FOREIGN PATENT DOCUMENTS

| EP | 2662913 A1 | 11/2013 |
|---|---|---|
| WO | 2013131548 A1 | 9/2013 |

OTHER PUBLICATIONS

International Search Report, International Application No. PCT/IB2018/050434, International Filing Date Jan. 24, 2018.

*Primary Examiner* — Anatoly Vortman

(57) ABSTRACT

A fused buss bar assembly for bussing battery cells of a battery module includes a plate configured to be terminated to a cell terminal of a corresponding battery cell and a buss bar fuse in the plate. The buss bar fuse having at least one connecting strip between a first base section and a second base section. The buss bar fuse has a fuse channel associated with the at least one connecting strip. The fuse channel reduces the cross-section of the buss bar fuse at the corresponding connecting strip such that the connecting strip has a reduced fused cross-section relative to a first cross-section of the first base section and a second cross-section of the second base section. The fused buss bar assembly includes a fuse bridge coupled to the buss bar fuse. The fuse bridge spans the fuse channel to electrically connect the first base section and the second base section.

20 Claims, 5 Drawing Sheets

(56) References Cited

U.S. PATENT DOCUMENTS

| | | | | |
|---|---|---|---|---|
| 6,476,705 | B1* | 11/2002 | Betti | B60R 16/02 337/161 |
| 6,509,824 | B2* | 1/2003 | Inaba | H01H 85/044 29/623 |
| 6,512,443 | B1* | 1/2003 | Matsumura | H01H 85/044 337/161 |
| 6,699,067 | B1* | 3/2004 | Zhao | H01R 12/7088 439/516 |
| 6,806,421 | B2* | 10/2004 | Matsumura | H01H 85/044 174/50 |
| 7,420,453 | B2* | 9/2008 | Matsumura | H01H 85/044 337/159 |
| 7,592,892 | B2* | 9/2009 | Ito | H01H 85/045 337/159 |
| 8,615,869 | B2* | 12/2013 | Chattot | H01M 2/1077 29/729 |
| 8,808,031 | B2* | 8/2014 | Zhao | H01M 2/206 439/620.27 |
| 8,821,190 | B2* | 9/2014 | Matsumura | H01H 85/044 337/186 |
| 9,384,929 | B2* | 7/2016 | Masuda | H01H 85/0241 |
| 9,490,090 | B2* | 11/2016 | Nohara | H01H 37/002 |
| 9,853,280 | B2* | 12/2017 | Zhao | H01M 2/1077 |
| 2013/0027174 | A1* | 1/2013 | Masuda | H01H 85/0241 337/142 |
| 2013/0052507 | A1* | 2/2013 | Dechant | H01M 2/348 429/121 |
| 2013/0306353 | A1* | 11/2013 | Zhao | H01M 2/206 174/133 B |
| 2014/0065467 | A1* | 3/2014 | Choi | H01M 2/30 429/158 |
| 2015/0357623 | A1* | 12/2015 | Onoda | H01M 2/34 429/61 |

\* cited by examiner

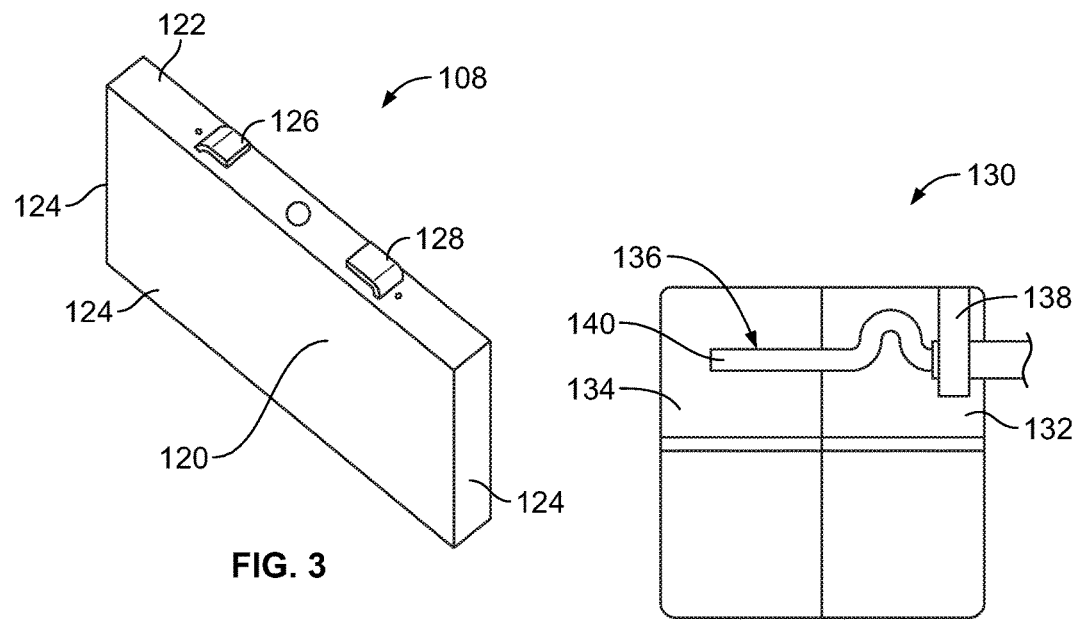
FIG. 3
FIG. 4
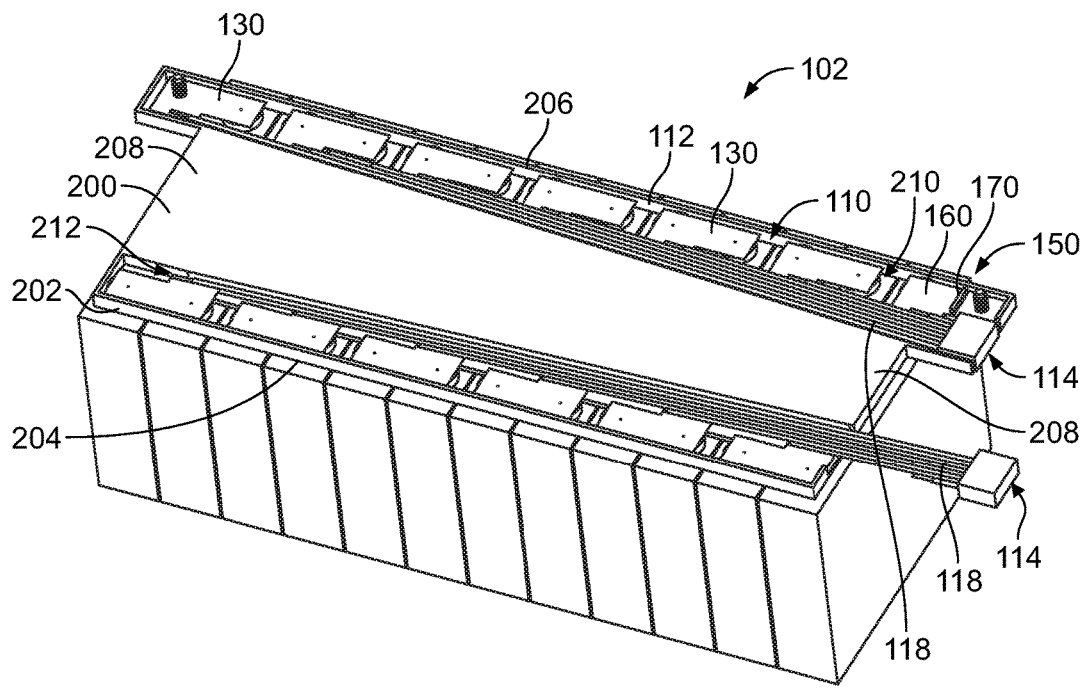
FIG. 11

BUSS BAR ASSEMBLY FOR A BATTERY SYSTEM

BACKGROUND OF THE INVENTION

The subject matter herein relates generally to battery connector systems.

Battery modules, such as those for electric vehicles or hybrid vehicles, typically includes a plurality of cells grouped together to form the battery modules. The battery modules are connected together to form battery packs. Each of the cells includes positive and negative cell terminals that are electrically connected together. The positive and negative cell terminals are connected using buss bars.

Safety regulations, such as section 38.3 of the UN Manual of Tests and Criteria (UN Transportation Testing UN 38.3), require that the battery modules be protected during transportation to protect from electrical shorting, which could lead to overheating and/or fire of the battery module. For example, the battery module is required to be fused to avoid a hazard during transportation, such as from the battery module manufacturer to the vehicle manufacturer that installs the battery module in a vehicle. Battery module manufacturers typically add an additional fuse to the battery module that is removed by the vehicle manufacturer when the battery module is installed in the vehicle. Such additional fuses are very expensive and discarded after the single use. Other battery module manufacturers provide holes in one or more of the buss bars to create a fused path in such buss bar. As current increases in the battery module, the battery module will fail at the fused path. However, while the addition of the holes is inexpensive, the area of reduced cross section carries less current than intended for the battery module, leading to failure of the battery module during use of the vehicle.

A need remains for a cost effective and reliable battery module having a fused path.

BRIEF DESCRIPTION OF THE INVENTION

In one embodiment, a fused buss bar assembly is provided for bussing battery cells of a battery module that includes a plate configured to be terminated to a cell terminal of a corresponding battery cell and a buss bar fuse in the plate. The buss bar fuse has at least one connecting strip between a first base section and a second base section. The buss bar fuse has a fuse channel associated with the at least one connecting strip. The fuse channel reduces the cross-section of the buss bar fuse at the corresponding connecting strip such that the connecting strip has a reduced fused cross-section relative to a first cross-section of the first base section and a second cross-section of the second base section. The fused buss bar assembly includes a fuse bridge coupled to the buss bar fuse. The fuse bridge spans the fuse channel to electrically connect the first base section and the second base section.

In a further embodiment, a carrier assembly is provided for battery cells of a battery module that includes a tray configured to be coupled to a top of the battery module over the battery cells holding a plurality of buss bars configured to electrically connect adjacent battery cells of the battery module and holding at least one fused buss bar assembly. The fused buss bar assembly includes a plate configured to be terminated to a cell terminal of a corresponding battery cell and a buss bar fuse in the plate. The buss bar fuse has at least one connecting strip between a first base section and a second base section. The buss bar fuse has a fuse channel associated with the at least one connecting strip that reduces the cross-section of the buss bar fuse at the corresponding connecting strip such that the connecting strip has a reduced fused cross-section relative to a first cross-section of the first base section and a second cross-section of the second base section. The fused buss bar assembly includes a fuse bridge coupled to the buss bar fuse spanning the fuse channel to electrically connect the first base section and the second base section.

In another embodiment, a battery system is provided including a plurality of battery cells being stacked forming a battery module and a carrier assembly mounted to the battery module having a tray holding a plurality of buss bars for electrically connecting adjacent battery cells of the battery module and holding at least one fused buss bar assembly. The fused buss bar assembly includes a plate configured to be terminated to a corresponding cell terminal and a buss bar fuse in the plate. The buss bar fuse has at least one connecting strip between a first base section and a second base section. The buss bar fuse has a fuse channel associated with the at least one connecting strip that reduces the cross-section of the buss bar fuse at the corresponding connecting strip such that the connecting strip has a reduced fused cross-section relative to a first cross-section of the first base section and a second cross-section of the second base section. The fused buss bar assembly includes a fuse bridge coupled to the buss bar fuse spanning the fuse channel to electrically connect the first base section and the second base section.

BRIEF DESCRIPTION OF THE DRAWINGS

FIG. 3 is a top perspective view of a battery cell of the battery module formed in accordance with exemplary embodiment.

FIG. 4 is a top perspective view of a buss bar of the battery module formed in accordance with an exemplary embodiment.

FIG. 11 is a front perspective view of a carrier assembly of the battery module holding the buss bars and the fused buss bar assembly.

DETAILED DESCRIPTION OF THE INVENTION

Figure 1:
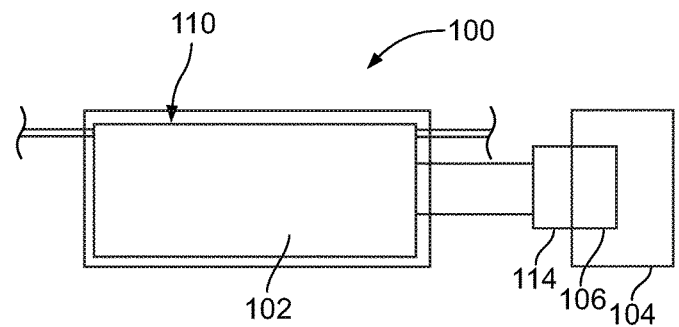
FIG. 1 is a schematic view of a battery system formed in accordance with an exemplary embodiment.

FIG. 1 is a top perspective view of a battery system 100 formed in accordance with an exemplary embodiment. The battery system 100 includes one or more battery modules 102 with corresponding carrier assemblies 110 mounted to the battery module(s) 102. The battery modules 102 may be stacked together as a battery pack used as part of the battery system 100, such as a battery system in a vehicle, such as an electric vehicle or a hybrid electrical vehicle. The battery system 100 may be used in other applications in alternative embodiments. The battery modules 102 may be contained within a housing.

In an exemplary embodiment, the battery system 100 includes a battery control module 104, which may be mounted near to the battery module(s) 102. The battery control module 104 controls activities of the battery modules 102. The battery control module 104 may include or communicate with a vehicle system controller to verify that the battery module 102 is operating within the parameters set for the current condition of the battery module 102. The battery control module 104 may monitor the voltage of the cells of the battery module 102. The battery control module 104 may monitor the temperature of the battery module 102. The battery control module 104 may supply fault codes to the vehicle. The battery control module 104 may be mounted above the battery module 102 or may be provided elsewhere, such as along a side of the battery module 102 or remote from the battery module 102.

The battery system 100 includes one or more connector assemblies 114 coupled to the battery control module 104, such as to corresponding control module connectors 106 of the battery control module 104. The connector assemblies 114 are electrically coupled to voltage sensors, temperature sensors or other types of sensors within the battery module 102 and routed to the battery control module 104.

Figure 2:
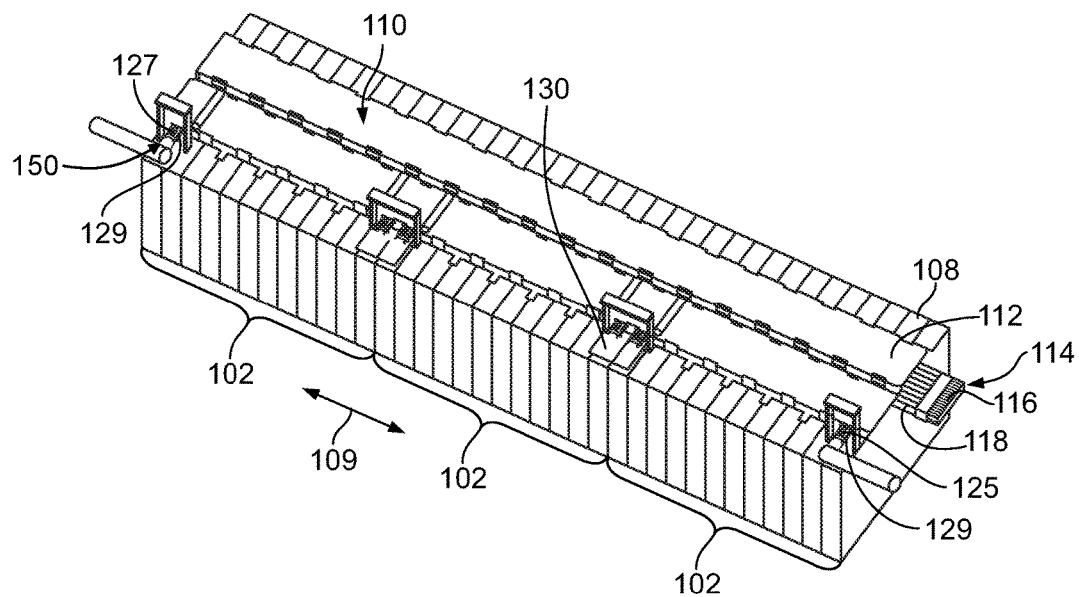
FIG. 2 is a top perspective view of battery modules of the battery system.

FIG. 2 is a top perspective view of a group of battery modules 102. The battery module 102 includes a plurality of battery cells 108, such as prismatic battery cells. The battery cells 108 are arranged in a stacked configuration, side-by-side, to form the battery module 102. The battery cells 108 are stacked in a cell stack-up direction 109. Optional, the battery module 102 may include a case or other housing that holds the battery cells 108. A battery cover may be provided over the tops of the battery cells 108. The battery cover may cover each of the battery cells 108.

Each battery module 102 includes a positive battery terminal 125 and a negative battery terminal 127. The battery terminals 125, 127 are configured to be coupled to external power cables or alternatively may be bussed to battery terminals 125, 127 of another battery module 102, such as using power terminals 129. Optionally, the battery terminals 125, 127 may be connected using quick-connection types of connectors.

The carrier assembly 110 is provided over the battery module 102. The carrier assembly 110 holds the one or more connector assemblies 114. The carrier assembly 110 includes one or more trays 112 holding a plurality of buss bars 130 (shown in FIG. 4) and one or more fused buss bar assemblies 150. The fused buss bar assembly 150 provides a fused connection for the battery module 102, such as for shipping, handling, and the like prior to assembly and use of the battery module 102 in the vehicle. The buss bars 130 are used to electrically connect adjacent battery cells 108. In an exemplary embodiment, the buss bars 130 have voltage sensors associated therewith. The connector assembly 114 is electrically connected to corresponding voltage sensors for monitoring voltage of the buss bars 130 and the battery cells 108.

The connector assembly 114 includes a connector 116 and a cable 118 terminated to corresponding terminals held in the connector 116. The connector 116 is configured to be mated with the corresponding control module connector 106 (shown in FIG. 1) of the battery control module 104 (shown in FIG. 1). The connector assembly 114 is electrically connected to the buss bars 130, such as to the voltage sensors, to monitor the voltage of the corresponding battery cells 108 of the battery module 102 by measuring the voltage across the buss bar 130 between the associated battery cells 108. For example, the cable 118 may include a plurality of wires electrically connected to corresponding buss bars 130. The cable 118 may be a flat flexible cable.

FIG. 3 is a top perspective view of one of the battery cells 108 formed in accordance with exemplary embodiment. The battery cell 108 includes a cell housing 120 having a top 122 and side walls 124. In the illustrated embodiment, the cell housing 120 is boxed shaped having four side walls 124. The cell housing 120 may have other shapes in alternative embodiments.

The battery cell 108 includes a positive cell terminal 126 and a negative cell terminal 128. In the illustrated embodiment, the terminals 126, 128 include flat pads having upper surfaces that define connection interfaces for electrical connection to corresponding buss bars 130 (shown in FIG. 4). Optionally, for the end battery cell 108 in the cell stack, the cell terminal 126 or 128 may define the battery terminal 125 or 127, respectively, for the battery module 102.

FIG. 4 is a top perspective view of one of the buss bars 130 formed in accordance with an exemplary embodiment. The buss bar 130 is used to electrically connect the cell terminals 126 or 128 (shown in FIG. 3) of adjacent battery cells 108 (shown in FIG. 2).

The buss bar 130 includes a positive plate 132 and a negative plate 134. The positive plate 132 is configured to be terminated to a corresponding positive cell terminal 126 of one battery cell 108 and the negative plate 134 is configured to be terminated to a corresponding negative cell terminal 128 of the adjacent battery cell 108. Optionally, the positive and negative plates 132, 134 may be of different metals, such as aluminum and copper.

In an exemplary embodiment, the buss bar 130 includes a voltage sensor 136 associated therewith. For example, the voltage sensor 136 may be an integral part of the buss bar 130 that is electrically connected to the connector assembly 114 for voltage monitoring. In other various embodiments, the voltage sensor 136 may be a separate component or connector connected to the buss bar 130. In the illustrated embodiment, the voltage sensor 136 is defined by the surface of one of the plates, such as the negative plate 134. In various other embodiments, the voltage sensor 136 may be a tab or protrusion extending from one of the plates, such as from an edge or a side of the buss bar 130. Optionally, such tab or protrusion may be stamped and formed with the buss bar 130. In alternative embodiments, the voltage sensor 136 may be a separate component coupled to the buss bar 130, such as by being soldered, welded, fastened or otherwise secured to the buss bar 130. In an exemplary embodiment, the voltage sensor 136 constitutes a weld tab configured to receive a wire 140 of the connector assembly 114 (shown in FIG. 1), which is welded to the weld tab. Welding provides a reliable connection with the flat wire 140 for accurate, reliable sensing. Other types of contacts other than the weld tab may be provided in alternative embodiments to connect to a corresponding component of the connector assembly 114, such as a crimp barrel, an insulation displacement contact, a spring contact, a pin, a socket, a poke-in wire connection, and the like. The wire 140 may be affixed to the buss bar 130, such as be crimping, welding, soldering, using conductive adhesive, and the like in other alternative embodiments.

In various embodiments, the buss bar 130 may include a strain relief tab 138 for securing the wire 140 to the buss bar 130, such as to reduce strain at the connection point of the wire 140 to the voltage sensor 136. For example, the strain relief tab 138 may reduce strain at the weld point between the wire 140 and the buss bar 130. In the illustrated embodiment, the strain relief tab 138 is a tab configured to be folded over to pinch the insulation of the wire 140 near the voltage sensor 136. Other types of strain relief tabs may be provided in alternative embodiments.

Figure 5:
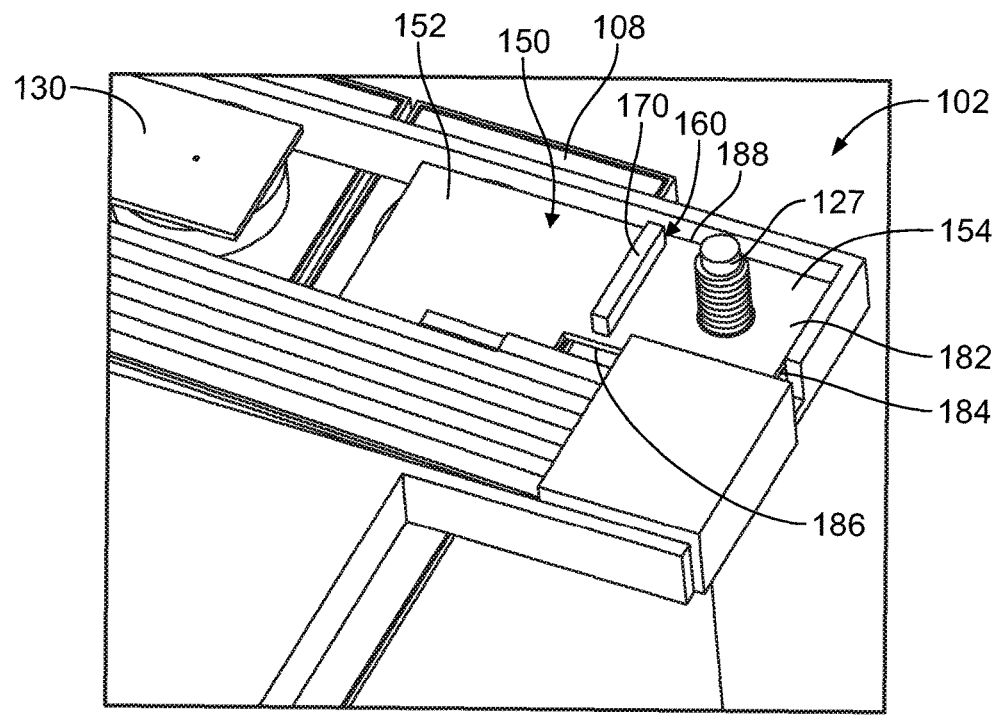
FIG. 5 is a top perspective view of a portion of the battery module showing a fused buss bar assembly of the battery module formed in accordance with an exemplary embodiment in an assembled state.
Figure 6:
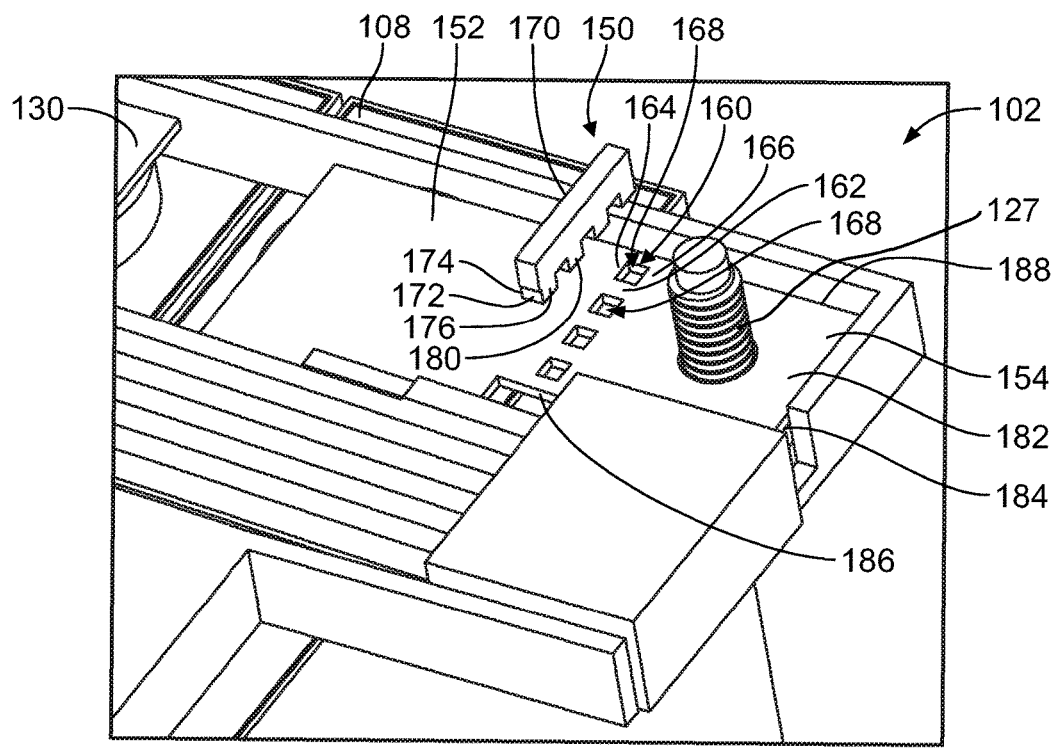
FIG. 6 is a top perspective view of a portion of the battery module showing the fused buss bar assembly formed in accordance with an exemplary embodiment in an unassembled state.

FIG. 5 is a top perspective view of a portion of the battery module 102 showing the fused buss bar assembly 150 formed in accordance with an exemplary embodiment in an assembled state. FIG. 6 is a top perspective view of a portion of the battery module 102 showing the fused buss bar assembly 150 formed in accordance with an exemplary embodiment in an unassembled state. The fused buss bar assembly 150 provides a modifiable fused path through the battery module 102. For example, the current carrying capacity of the fused path may be increased or decreased at different times. For example, a removable component may be incorporated to bypass a fused path formed in the structure to increase the current carrying capacity.

The fused buss bar assembly 150 provides a fused connection for the battery module 102, such as for shipping, handling, and the like prior to assembly and use of the battery module 102 in the vehicle. For example, the fused buss bar assembly 150 provides a fused connection within the battery module 102 to prevent overheating or damage to the battery module 102. The fused buss bar assembly 150 may provide a fused connection to prevent short-circuiting of the battery module 102, such as during shipping and handling of the battery module 102 prior to installation and assembly in the vehicle when the battery module 102 is connected to a fused circuit to protect the battery module 102. The fused buss bar assembly 150 provides a high resistance circuit in the battery module 102 that acts as a sacrificial device to provide overcurrent protection. For example, when too much current flows through the fused buss bar assembly 150, the fused buss bar assembly 150 interrupts the battery circuit to interrupt the excessive current so that further damage by overheating or fire is prevented. The fused buss bar assembly 150 may satisfy safety requirements, such as section 38.3 of the UN Manual of Tests and Criteria (UN Transportation Testing UN 38.3), for transportation of the battery module 102, such as transportation between the battery module manufacturer and the vehicle manufacturer that installs the battery module 102 in the vehicle. For example, the transportation may be shipping in an aircraft, boat, train, truck, and the like, such as in a shipping container, subject to accident, dropping, vibration, mechanical shock, and the like.

The fused buss bar assembly 150 is used to electrically connect to one or more cell terminals 126 or 128 (shown in FIG. 3) or battery terminals 125 or 127 (shown in FIG. 2) of corresponding battery cells 108 (shown in FIG. 2). In an exemplary embodiment, the fused buss bar assembly 150 includes one or more plates 152, 154 also referred to hereinafter as a first plate 152 and a second plate 154. The first plate 152 is configured to be terminated to a corresponding cell terminal 126, 128 or battery terminal 125, 127 of one of the battery cells 108. The second plate 154 is configured to be terminated to a corresponding cell terminal 126, 128 or battery terminal 125, 127 or power terminal 129 (shown in FIG. 2). Optionally, the plates 152, 154 may be of different metals, such as aluminum and copper. The first plate 152 may be a positive plate or a negative plate. The second plate 154 may be a positive plate or a negative plate.

The fused buss bar assembly 150 includes a buss bar fuse 160 in the plate 152 and/or 154. In an exemplary embodiment, the buss bar fuse 160 is between the plates 152, 154 and may be integral with either or both of the plates 152 and/or 154. The buss bar fuse 160 electrically connects the plates 152, 154. The buss bar fuse 160 defines a fused circuit between the plates 152, 154. In an overcurrent condition, the buss bar fuse 160 may melt or break thus electrically disconnecting the plates 152, 154.

The buss bar fuse 160 includes connecting strips 162 between a first base section 164 and a second base section 166. Any number of connecting strips 162 may be provided between the base sections 164, 166. The buss bar fuse 160 has one or more fuse channels 168 associated with the connecting strips 162. The fuse channels 168 reduce the cross-section of the buss bar fuse 160 at the corresponding connecting strip 162 and fuse channel 168 location. As such, in an overcurrent condition, the buss bar fuse 160 will fail or break in the reduced cross-section area at the connecting strip 162 and fuse channel 168 location.

In an exemplary embodiment, the first base section 164 extends from the first plate 152 and the second base section 166 extends from the second plate 154. The first base section 164 may be integral with the first plate 152 and/or the second base section 166 may be integral with the second plate 154. For example, the first plate 152 may define the first base section 164 (for example, the first base section 164 is defined by an inner end of the first plate 152). The second plate 154 may define the second base section 166 (for example, the second base section 166 is defined by an inner end of the second plate 154). The first plate 152 may have the same thickness and width as the first base section 164 and the second plate 154 may have the same thickness and width as the second base section 166.

In an exemplary embodiment, the buss bar fuse 160 has a reduced fused cross-section relative to a first cross-section of the first base section 164 and a second cross-section of the second base section 166. For example, the fuse channel(s) 168 may reduce the cross-sectional area of the buss bar fuse 160 as compared to the base sections 164, 166. The connecting strips 162 may have a reduced cross-section as compared to the base sections 164, 166. For example, the thickness and/or width of material in the area of the connecting strips 162 and fuse channels 168 may be reduced as compared to the base sections 164, 166.

In an exemplary embodiment, the fused buss bar assembly 150 includes a fuse bridge 170 separate and discrete from the buss bar fuse 160 that is configured to be coupled to the buss bar fuse 160 to bridge the first and second base sections 164, 166. The fuse bridge 170 spans the fuse channels 168 to electrically connect the first base section 164 and the second base section 166. The fuse bridge 170 increases the current carrying capacity between the base sections 164, 166. For example, the cumulative current carrying capacity of the fuse bridge 170 and the connecting strips 162 is greater than the current carrying capacity of just the connecting strips 162. The fuse bridge 170 is removably coupled to the fused buss bar 160 such that the current carrying capacity when the fuse bridge 170 is present and assembled (FIG. 5) is greater than when the fuse bridge 170 is unassembled (FIG. 6) and thus not present. For example, prior to installation and assembly of the battery module 102 into the vehicle, the fuse bridge 170 may be decoupled from the bused buss bar 160 (FIG. 6), providing a fused circuit in the fused buss bar 160, such as for shipping and handling of the battery module 102 (for example, from the time of manufacture of the battery module 102 until installation of the battery module 102 in the vehicle). Once the battery module 102 is installed in the vehicle, the fuse bridge 170 may be coupled to the fused buss bar 160 (FIG. 5) to increase the current carrying capacity of the battery module 102 through the fused buss bar assembly 150. The fuse function is eliminated after the fuse bridge 170 is assembled because the system is capable of handling the higher current.

Optionally, the fuse bridge 170 may include a connecting strip interface 172 engaging one or more of the connecting strips 162. In an exemplary embodiment, the fuse bridge 170 includes a first interface 174 engaging the first base section 164 and a second interface 176 engaging the second base section 166. The body of the fuse bridge 170 electrically connects the interfaces 172, 174, 176 to electrically connect the base sections 164, 166, and thus the plates 152, 154. For example, the body of the fuse bridge 170 may be a single, unitary metal structure. Optionally, the fuse bridge 170 may extend into and be received in the fuse channels 168. For example, the fuse bridge 170 may include protrusions 180 extending into corresponding fuse channels 168. The protrusions 180 may define the connecting strip interface 172 and/or the first interface 174 and/or the second interface 176.

The buss bar fuse 160 includes a top 182, a bottom 184, a first side 186 and a second side 188. The buss bar fuse 160 has a thickness between the top 182 and the bottom 184 and a width between the first and second sides 186, 188. In an exemplary embodiment, the fuse channels 168 are openings through the buss bar fuse 160 between the top 182 and the bottom 184. The openings 168 extend entirely through the thickness of the buss bar fuse 160. For example, the openings 168 may be drilled or stamped in the buss bar fuse 160. The openings 168 are positioned between the first and second base sections 164, 166. The connecting strips 162 are positioned between and separate the openings 168. The connecting strips 162 and the openings 168 may have any size and shape and the size and shape of the openings 168 and connecting strips 162 determine the mechanical strength of the buss bar fuse 160 in the fuse region and the fuse rating of the fuse region, such as the current carrying capacity of the fuse region before failure (for example, melting) occurs. In the illustrated embodiment, the openings 168 are rectangular; however the openings 168 may have other shapes in alternative embodiments.

In an exemplary embodiment, the fuse bridge 170 is a jammer block configured to be pressed into the buss bar fuse 160 to mechanically and electrically connect to the buss bar fuse 160. For example, the jammer block 170 may be jammed into the openings 168. The jammer block 170 may include a handle to install and remove the jammer block 170.

When installed, the fuse bridge 170 spans the openings 168 between the base sections 164, 166. The protrusions 180 at least partially fill in the openings 168 between the first and second base sections 164, 166 and/or between the connecting strips 162. Optionally, the protrusions 180 may have a complementary shape as the openings 168 to substantially or entirely fill the openings 168. The protrusions 180 may have chamfered lead-ins to ease assembly. The protrusions 180 may be press-fit into the openings 168. For example, the protrusions may engage the base sections 164, 166 and/or the connecting strips 162 by an interference fit. The protrusions 180 and/or the buss bar fuse 160 may include crush ribs that are deformed when the fuse bridge 170 is coupled to the buss bar fuse 160. In the illustrated embodiment, the protrusions 180 pass entirely through the buss bar fuse 160. For example, the fuse bridge 170 may be coupled to the top 182 and pressed into the buss bar fuse 160 such that the protrusions 180 extend out of the bottom 184. Alternatively, the fuse bridge 170 may be bottom loaded into the buss bar fuse 160. When assembled, the connecting strips 162 carry current between the first and second base sections 164, 166 and the fuse bridge 170 carries current between the first and second base sections 164, 166. For example, the protrusions 180 may directly engage both base sections 164, 166 to electrically connect the base sections 164, 166 and carry current therebetween. The protrusions 180 may also directly engage both adjacent connecting strips 162 to electrically connect the connecting strips 162 and carry current therebetween. Optionally, the bottom of the jammer block 170 may engage the top 182 at the first base section 164 and/or the second base section 166 to electrically connect thereto.

Figure 7:
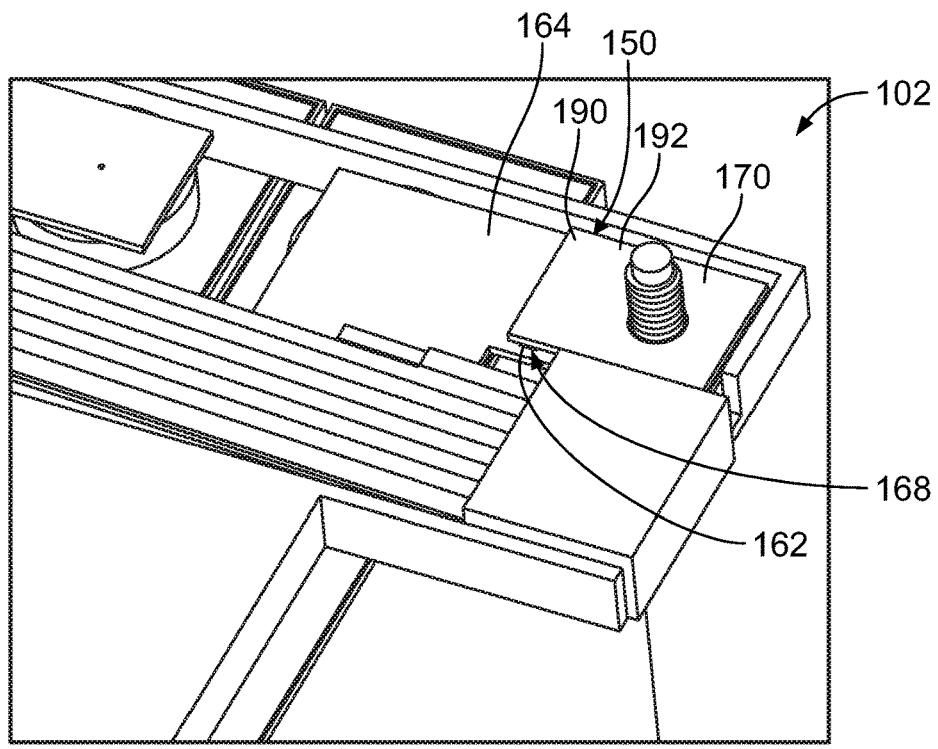
FIG. 7 is a top perspective view of a portion of the battery module showing a fused buss bar assembly of the battery module formed in accordance with an exemplary embodiment in an assembled state.
Figure 8:
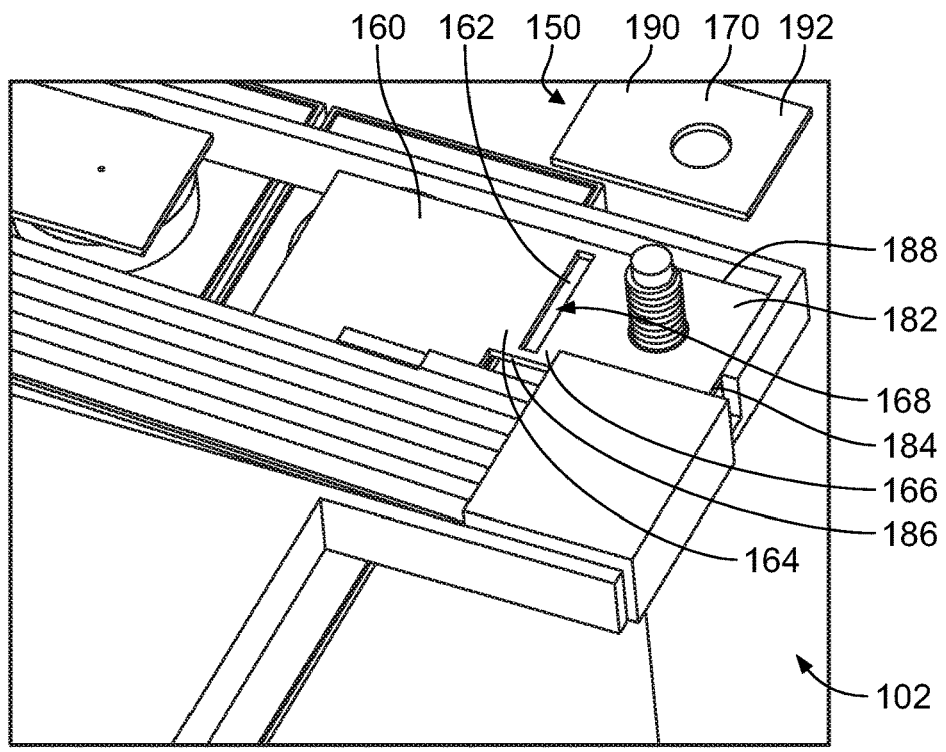
FIG. 8 is a top perspective view of a portion of the battery module showing the fused buss bar assembly formed in accordance with an exemplary embodiment in an unassembled state.

FIG. 7 is a top perspective view of a portion of the battery module 102 showing the fused buss bar assembly 150 formed in accordance with an exemplary embodiment in an assembled state. FIG. 8 is a top perspective view of a portion of the battery module 102 showing the fused buss bar assembly 150 formed in accordance with an exemplary embodiment in an unassembled state. In the illustrated embodiment, the fuse channel 168 is a groove in the top 182 extending between the first and second base sections 164, 166. The groove 168 is positioned between the first and second sides 186, 188. The groove 168 does not extend entirely through the buss bar fuse 160 as did the openings (FIG. 5). In contrast, the groove 168 defines a thinned area of the buss bar fuse 160 having a reduced thickness. The connecting strip 162 is located below the groove 168. The connecting strip 162 is thinner than the first base section 164 and the second base sections 166. In an overcurrent situation, the buss bar fuse 160 would fail and melt at the area of the connecting strip 162 and the groove 168.

The fuse bridge 170 of the fused buss bar assembly 150 is an overlapping plate rather than a jammer block in the illustrated embodiment. For example, the overlapping plate 170 includes a plate body including a first side 190 overlapping and being electrically connected to the first base section 164 and a second side 192 overlapping and being electrically connected to the second base section 166. In the illustrated embodiment, the first and second sides 190, 192 are welded to the base sections 164, 166. The plate body spans across the fuse channel 168 (for example, the groove). When installed, the overlapping plate 170 increases the current carrying capacity of the fused buss bar assembly 150, as compared to the current carrying capacity allowed by the buss bar fuse 160 without the overlapping plate 170. The fuse function is eliminated after the overlapping plate 170 is installed.

Optionally, the plate body of the overlapping plate 170 may include a protrusions extending into the groove 168. The protrusion may engage the connecting strip 162. In other various embodiments, the groove 168 may be provided on the bottom 184 of the buss bar fuse 160 and the overlapping plate 170 may extend along the connecting strip 162 at the top 182. The overlapping plate 170 may be welded to the connecting strip 162. In other various embodiments, the buss bar fuse 160 may include the openings (FIG. 5) rather than the groove 168.

Figure 9:
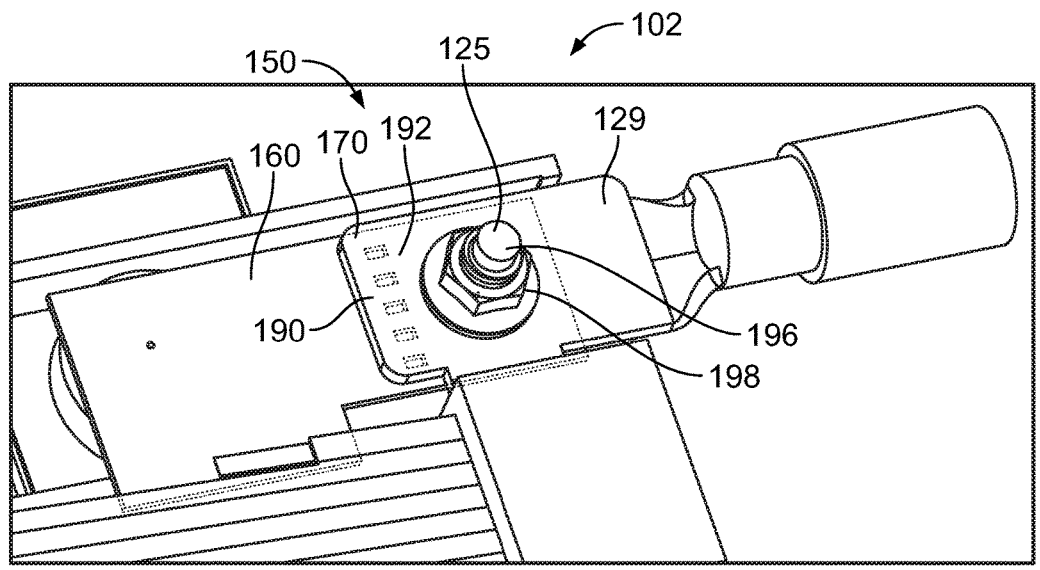
FIG. 9 is a top perspective view of a portion of the battery module showing a fused buss bar assembly of the battery module formed in accordance with an exemplary embodiment in an assembled state.
Figure 10:
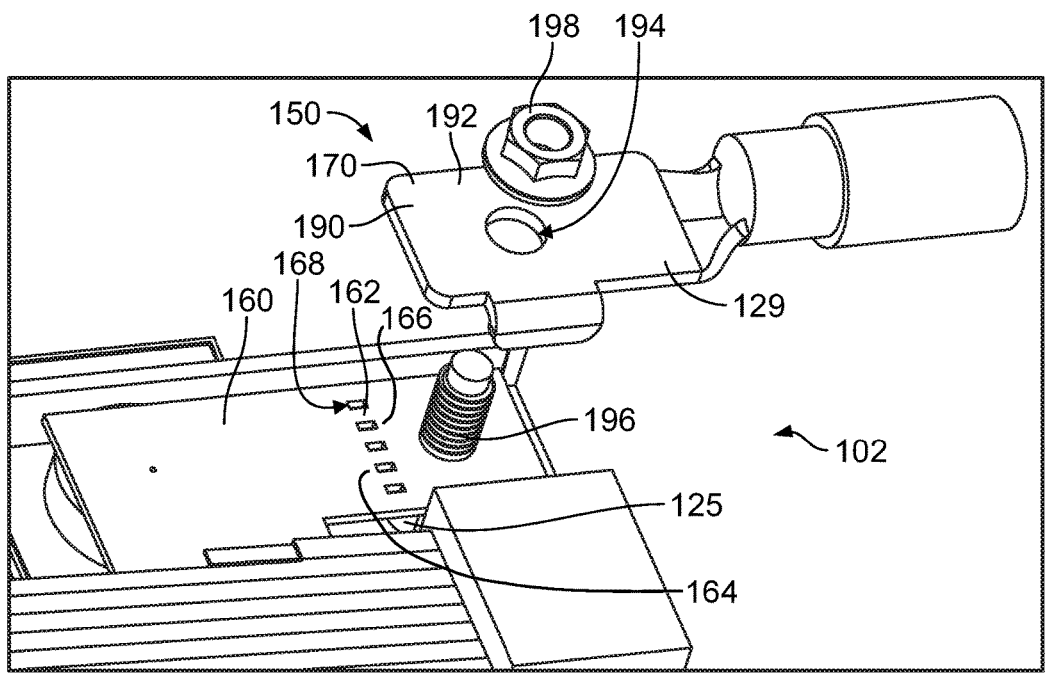
FIG. 10 is a top perspective view of a portion of the battery module showing the fused buss bar assembly formed in accordance with an exemplary embodiment in an unassembled state.

FIG. 9 is a top perspective view of a portion of the battery module 102 showing the fused buss bar assembly 150 formed in accordance with an exemplary embodiment in an assembled state. FIG. 10 is a top perspective view of a portion of the battery module 102 showing the fused buss bar assembly 150 formed in accordance with an exemplary embodiment in an unassembled state. In the illustrated embodiment, the fuse bridge 170 is part of the power terminal 129. The power terminal 129 includes the plate body including the first side 190 overlapping and being electrically connected to the first base section 164 and the second side 192 overlapping and being electrically connected to the second base section 166.

In an exemplary embodiment, the second side 192 includes an opening 194 for receiving a post 196 of the battery terminal 125. A nut 198 is configured to be threadably coupled to the post 196 to secure the fuse bridge 170 and the power terminal 129 to the battery terminal 125. When the nut 198 is tightened, the second side 192 is mechanically and electrically connected to the second base section 166. Optionally, when the nut 198 is tightened, the fuse bridge 170 is pressed downward against the buss bar fuse 160 such that the first side 190 is mechanically and electrically connected to the first base section 164. In other various embodiments, the first side 190 may include a spring tab at the bottom that is configured to be spring biased against the first base section 164 when the nut 198 is tightened to ensure a reliable electrical connection with the buss bar fuse 160.

The plate body of the overlapping plate 170 of the power terminal 129 spans across the fuse channels 168 (for example, the openings in the illustrated embodiment). When installed, the overlapping plate 170 increases the current carrying capacity of the fused buss bar assembly 150, as compared to the current carrying capacity allowed by the buss bar fuse 160 without the overlapping plate 170. Some of the current passes through the connecting strips 162 between the base sections 164, 166 while some of the current passes through the fuse bridge 170 of the power terminal 129. The fuse function is eliminated after the power terminal 129 is assembled.

FIG. 11 is a front perspective view of the carrier assembly 110 and a plurality of the connector assemblies 114 mounted to a battery module 102. The carrier assembly 110 includes the tray 112 holding the buss bars 130. The tray 112 includes a top 200 and a bottom 202. The bottom 202 is configured to be mounted to the battery module 102. The tray 112 includes a front 204 and a rear 206 with sides 208 therebetween. A cover may be coupled to the tray 112 at the top 200 to cover the cable 118.

The tray 112 includes pockets 210 receiving corresponding buss bars 130 and the fused buss bar assembly 150. Optionally, the pockets 210 may be positioned generally along the front 204 and the rear 206. The tray 112 includes channels 212 extending between various pockets 210. The cables 118 may be routed in the channels 212 to interface with the corresponding buss bars 130.

The fused buss bar assembly 150 provides a fused circuit for the battery module 102 to satisfy safety requirements, such as section 38.3 of the UN Manual of Tests and Criteria (UN Transportation Testing UN 38.3), for transportation of the battery module 102, and provides the fuse bridge 170 to be assembled to the battery module 102 when the battery module 102 is in use in the vehicle. As such, the battery module 102 is safe when being transported between the battery module manufacturer and the vehicle manufacturer that installs the battery module 102 in the vehicle by provided a fused circuit path that may be opened to prevent overheating and fire, such as when short circuited during transportation. However, the fuse bridge 170, when installed, increases the current carrying capacity of the buss bar fuse 160 to acceptable performance levels, such as equivalent to the buss bars 130, to allow normal operation of the battery module 102 in the vehicle. The battery module 102 is less susceptible to malfunction from a blown fuse during use in the vehicle as the fused buss bar assembly 150 is capable of handling normal operating currents that the buss bars 130 handle. Furthermore, the fuse bridge 170 provides an inexpensive solution to increasing the current carrying capacity of the fused buss bar assembly 150 as compared to conventional fuses that are utilized in some conventional battery modules and then discarded after the battery module is installed in the vehicle.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A fused buss bar assembly for bussing battery cells of a battery module, the fused buss bar assembly comprising:
   a plate configured to be terminated to a cell terminal of a corresponding battery cell;
   a buss bar fuse in the plate, the buss bar fuse having at least one connecting strip between a first base section and a second base section, the buss bar fuse having a fuse channel associated with the at least one connecting strip, the fuse channel reducing the cross-section of the buss bar fuse at the corresponding connecting strip such that the connecting strip has a reduced fused cross-section relative to a first cross-section of the first base section and a second cross-section of the second base section; and
   a fuse bridge coupled to the buss bar fuse, the fuse bridge spanning the fuse channel to electrically connect the first base section and the second base section;
   wherein the fuse bridge is configured to be removed from the buss bar fuse during shipping and handling of the battery module and the fuse bridge is configured to be installed and coupled to the buss bar fuse during normal use of the battery module in the vehicle.

2. The buss bar assembly of claim 1, wherein the fuse bridge is removably coupled to the buss bar fuse.

3. The buss bar assembly of claim 1, wherein the fuse bridge includes a first interface engaging the first base section and the fuse bridge include a second interface engaging the second base section.

4. The buss bar assembly of claim 1, wherein the fuse channel comprises an opening extending through the buss bar fuse between the first and second base sections, the fuse bridge at least partially filling the opening between the first and second base sections.

5. The buss bar assembly of claim 1, wherein the buss bar fuse includes a top, a bottom, a first side and a second side, the fuse channel comprising an opening through the buss bar fuse between the top and the bottom, the opening positioned between the first and second base sections, the fuse bridge at least partially filling the opening between the first and second base sections.

6. The buss bar assembly of claim 1, wherein the buss bar fuse includes a top, a bottom, a first side and a second side, the fuse channel comprising a groove in the top extending between the first and second sides, the groove positioned between the first and second base sections, the fuse bridge spanning the groove between the first and second base sections.

7. The buss bar assembly of claim 6, wherein the fuse bridge includes a protrusion extending into the groove to at least partially fill the groove between the first and second base sections.

8. The buss bar assembly of claim 1, further comprising a plurality of connecting strips and a plurality of fuse channels between corresponding connecting strips, the fuse bridge spanning the plurality of fuse channels.

9. The buss bar assembly of claim 1, wherein the fuse bridge is a jammer block having a protrusion received in the fuse channel to electrically connect the first and second base sections.

10. The buss bar assembly of claim 1, wherein the fuse bridge is an overlapping plate having a first side overlapping and being electrically connected to the first base section and a second side overlapping and being electrically connected to the second base section.

11. The buss bar assembly of claim 1, wherein the connecting strip carries current between the first and second base sections and the fuse bridge carries current between the first and second base sections.

12. The buss bar assembly of claim 1, wherein the plate is a positive plate configured to be terminated to a positive cell terminal of a corresponding battery cell, the fused buss bar assembly further comprising a negative plate configured to be terminated to a negative cell terminal of a corresponding battery cell, the buss bar fuse being positioned between the positive and negative plates, the first base section of the buss bar fuse extending from the positive plate, the second base section of the buss bar fuse extending from the negative plate.

13. A carrier assembly for battery cells of a battery module, the carrier assembly comprising:
a tray configured to be coupled to a top of the battery module over the battery cells, the tray holding a plurality of buss bars configured to electrically connect adjacent battery cells of the battery module, the tray holding at least one fused buss bar assembly, the fused buss bar assembly comprising:
a plate configured to be terminated to a cell terminal of a corresponding battery cell;
a buss bar fuse in the plate, the buss bar fuse having at least one connecting strip between a first base section and a second base section, the buss bar fuse having a fuse channel associated with the at least one connecting strip, the fuse channel reducing the cross-section of the buss bar fuse at the corresponding connecting strip such that the connecting strip has a reduced fused cross-section relative to a first cross-section of the first base section and a second cross-section of the second base section; and
a fuse bridge coupled to the buss bar fuse, the fuse bridge spanning the fuse channel to electrically connect the first base section and the second base section;
wherein the fuse bridge is configured to be removed from the buss bar fuse during shipping and handling of the battery module and the fuse bridge is configured to be installed and coupled to the buss bar fuse during normal use of the battery module in the vehicle.

14. The carrier assembly of claim 13, wherein the fuse bridge is removably coupled to the buss bar fuse.

15. The carrier assembly of claim 13, wherein the fuse bridge includes a first interface engaging the first base section and the fuse bridge include a second interface engaging the second base section.

16. The carrier assembly of claim 13, wherein the fuse channel comprises an opening extending through the buss bar fuse between the first and second base sections, the fuse bridge at least partially filling the opening between the first and second base sections.

17. The carrier assembly of claim 13, wherein the connecting strip carries current between the first and second base sections and the fuse bridge carries current between the first and second base sections.

18. A battery system comprising:
a plurality of battery cells being stacked forming a battery module;
a carrier assembly mounted to the battery module, the carrier assembly having a tray holding a plurality of buss bars for electrically connecting adjacent battery cells of the battery module, the tray holding at least one fused buss bar assembly, the fused buss bar assembly comprising:
a plate configured to be terminated to a cell terminal of a corresponding battery cell;
a buss bar fuse in the plate, the buss bar fuse having at least one connecting strip between a first base section and a second base section, the buss bar fuse having a fuse channel associated with the at least one connecting strip, the fuse channel reducing the cross-section of the buss bar fuse at the corresponding connecting strip such that the connecting strip has a reduced fused cross-section relative to a first cross-section of the first base section and a second cross-section of the second base section; and
a fuse bridge coupled to the buss bar fuse, the fuse bridge spanning the fuse channel to electrically connect the first base section and the second base section;
wherein the fuse bridge is configured to be removed from the buss bar fuse during shipping and handling of the battery module and the fuse bridge is configured to be installed and coupled to the buss bar fuse during normal use of the battery module in the vehicle.

19. The battery system of claim 18, wherein the fuse bridge is removably coupled to the buss bar fuse.

20. The battery system of claim 18, wherein the fuse bridge includes a first interface engaging the first base section and the fuse bridge include a second interface engaging the second base section.

* * * * *